(12) United States Patent
Smith et al.

(10) Patent No.: US 10,089,013 B2
(45) Date of Patent: Oct. 2, 2018

(54) SYSTEM AND METHOD FOR MANAGING A NON-VOLATILE STORAGE RESOURCE AS A SHARED RESOURCE IN A DISTRIBUTED SYSTEM

(71) Applicant: Datrium, Inc., Sunnyvale, CA (US)

(72) Inventors: Garrett Smith, San Francisco, CA (US); Nitin Garg, Santa Clara, CA (US); Alex Mirgorodsky, San Mateo, CA (US); R. Hugo Patterson, III, Los Altos, CA (US); Vasudevan Sangili, San Jose, CA (US); Ganesh Venkitachalam, Palo Alto, CA (US)

(73) Assignee: Datrium, Inc., Sunnyvale, CA (US)

( * ) Notice: Subject to any disclaimer, the term of this patent is extended or adjusted under 35 U.S.C. 154(b) by 213 days.

(21) Appl. No.: 15/249,414

(22) Filed: Aug. 28, 2016

(65) Prior Publication Data

US 2016/0364145 A1    Dec. 15, 2016

Related U.S. Application Data

(63) Continuation-in-part of application No. 14/710,541, filed on May 12, 2015, which is a continuation-in-part of application No. 13/998,531, filed on Nov. 7, 2013.

(Continued)

(51) Int. Cl.
*G06F 3/06* (2006.01)
*G06F 9/50* (2006.01)
(Continued)

(52) U.S. Cl.
CPC .............. *G06F 3/061* (2013.01); *G06F 3/067* (2013.01); *G06F 3/0631* (2013.01); *G06F 9/50* (2013.01); *G06F 11/1402* (2013.01); *G06F 11/1448* (2013.01); *G06F 17/30159* (2013.01); *G06F 17/30218* (2013.01); *G06F 2211/1009* (2013.01); *G06F 2211/1028* (2013.01); *G06F 2211/1088* (2013.01)

(58) Field of Classification Search
CPC ........ G06F 3/061; G06F 3/0631; G06F 3/067; G06F 11/1402; G06F 11/1448; G06F 17/30159; G06F 17/30218
See application file for complete search history.

(56) References Cited

U.S. PATENT DOCUMENTS 6,055,604 A * 4/2000 Voigt ..................... G11B 19/12
                                                     710/52
7,370,143 B1 * 5/2008 Scott ....................... G06F 3/061
                                                     711/113

(Continued)

*Primary Examiner* — Ryan Bertram
(74) *Attorney, Agent, or Firm* — Hickman Palermo Becker Binghma LLP

(57) ABSTRACT

A data storage system has a plurality of hosts that request writes of data to a relatively high-performance storage device (RHPSD) such as NVRAM, which may be one of a plurality of RHPSDs in a plurality of storage nodes. A storage management system receives the write requests and writes received data to the RHPSD. According to an allocation policy, the storage management system indicates to at least one of the hosts that it should limit its use of RHPSD and it then discards data upon indication from that host to do so. Before being discarded from the RHPSD, the data may be written to a persistent storage device.

39 Claims, 1 Drawing Sheet

Related U.S. Application Data

(60) Provisional application No. 62/211,693, filed on Aug. 28, 2015.

(51) Int. Cl.
*G06F 11/14* (2006.01)
*G06F 17/30* (2006.01)

(56) References Cited

U.S. PATENT DOCUMENTS

| | | | |
|---|---|---|---|
| 8,806,115 B1 * | 8/2014 | Patel | G06F 11/1471 711/103 |
| 9,952,765 B2 * | 4/2018 | Krishnamachari | G06F 3/0604 |
| 2003/0188119 A1 * | 10/2003 | Lubbers | G06F 9/50 711/170 |
| 2004/0194114 A1 * | 9/2004 | Spiegel | G06F 11/073 719/318 |
| 2015/0261797 A1 * | 9/2015 | Alcantara | G06F 17/30306 707/813 |
| 2015/0268860 A1 * | 9/2015 | Yum | G06F 3/061 711/154 |
| 2017/0011062 A1 * | 1/2017 | Zaveri | G06F 17/30377 |
| 2017/0097873 A1 * | 4/2017 | Krishnamachari | G06F 3/0604 |

* cited by examiner

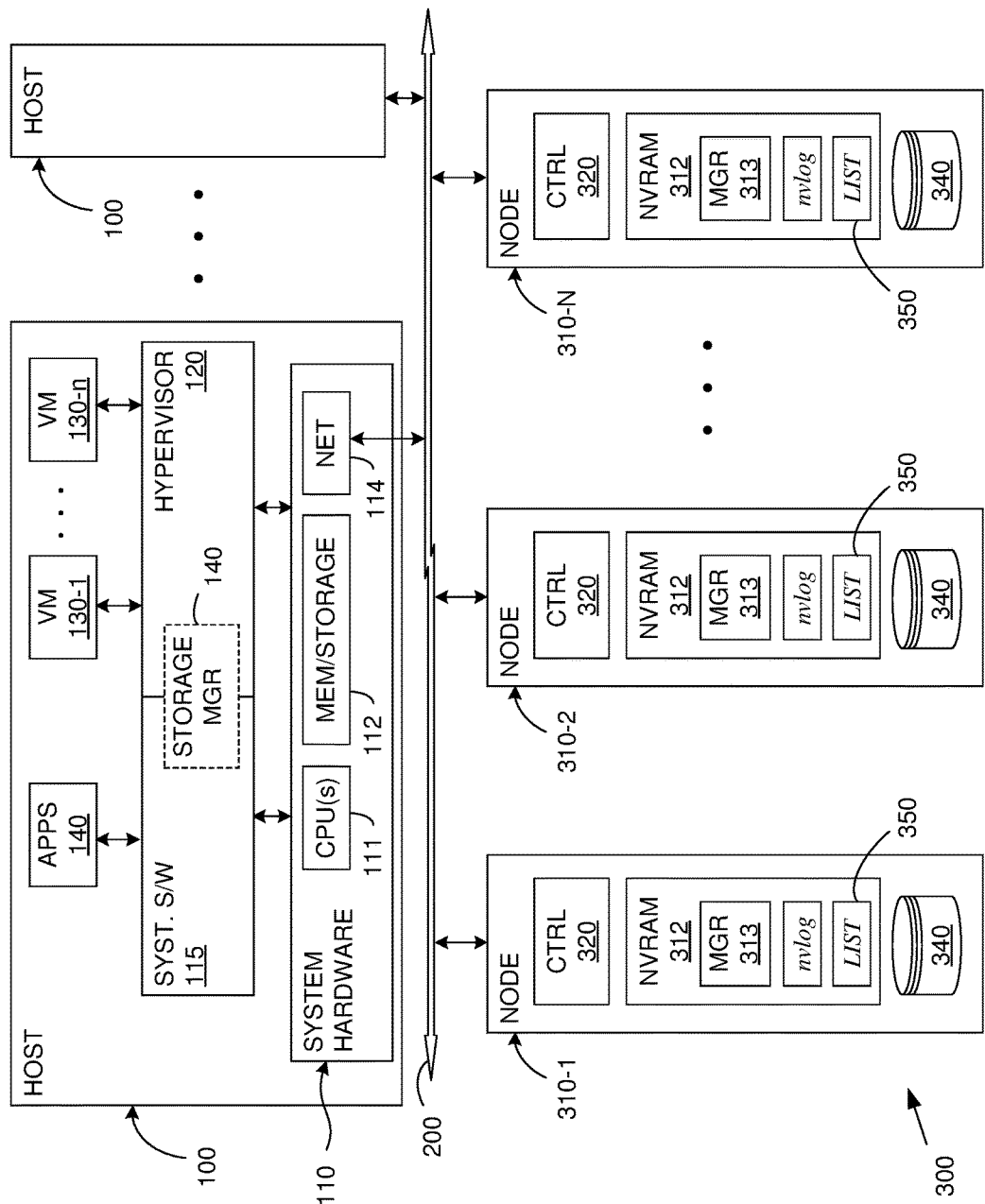

SYSTEM AND METHOD FOR MANAGING A NON-VOLATILE STORAGE RESOURCE AS A SHARED RESOURCE IN A DISTRIBUTED SYSTEM

CROSS-REFERENCE TO RELATED APPLICATIONS

This application claims priority of U.S. Patent Application 62/211,693, filed 28 Aug. 2015, and is also a Continuation-in-Part and claims priority of pending U.S. patent application Ser. No. 14/710,541, filed 12 May 2015, which in turn is a Continuation-in-Part of and claims priority of U.S. patent application Ser. No. 13/998,531, filed 7 Nov. 2013, the contents of all three of which are incorporated here by reference.

BACKGROUND

High-performance, non-volatile storage is a crucial aspect of a storage system. One advantage of this storage technology is that it allows writes to be acknowledged quickly while ensuring the stored data will not be lost in the event of power loss. A disadvantage, however, is that, compared with other media in a typical storage system it is a relatively expensive and therefore usually scarce resource. What is needed is a way to leverage the advantages of such high-performance, non-volatile storage to provide better performance for multiple clients that wish to use it, but without relying on the expensive solution of simply architecting more of it in the storage system.

BRIEF DESCRIPTION OF THE DRAWINGS

FIG. 1 illustrates the main components of a system in which high-performance, non-volatile storage is shared and allocated among a plurality of clients in a distributed storage system.

DETAILED DESCRIPTION

In broad terms, embodiments of the invention involve a novel system for managing high-performance, non-volatile storage as a standalone resource shared by a plurality of clients in a distributed storage system. Merely because it is at present perhaps the most common technology used for high-performance, non-volatile storage, non-volatile RAM ("NVRam") is referred to below for convenience and merely by way of example as such storage components. This technology is not a requirement to practice the invention, however; rather, as skilled storage system engineers will understand from the description below, the techniques described below may be used to manage any storage resource that in any sense has higher performance but is more scarce than some other storage resource that is made available to clients. Moreover, as technology improves, the NVRam of today may in the future become the relatively "cheap" and abundant storage resource relative to some newer technology that then may be viewed as the high-performance, non-volatile storage technology to be managed using this invention.

In U.S. patent application Ser. No. 14/710,541, of which this application is a continuation-in-part and incorporates by reference, a host, which wishes to write data, first writes ("appends") the data to a log associated with the NVRam on a plurality of storage nodes. After buffering some number of writes, it packs a data container with the writes and writes the container to an arrangement of "Chunk Stores" on the storage nodes. The host may then truncate the log to free up some NVRam in a "discard" operation—once the newly written data is safely on persistent medium such as a disk, no copy is needed in NVRam. Embodiments of this invention improve on that system by enabling and implementing various efficient NVRam allocation mechanisms.

See FIG. 1. Each of one or more host platforms 100, which may and typically will be servers, includes system hardware 110, including one or more processors (CPU's) 111, and some device(s) 112 for non-persistent, volatile memory and/or persistent, non-volatile, non-transitory storage.

The system hardware 110 will also include other conventional mechanisms such as a network connection device 114 for transfer of data between the various components of the system and one or more network(s) 200, which may be any known public or proprietary local or wide-area network such as the Internet, an internal enterprise network, etc. Note that, depending on the implementation and nature of the system, the host(s) may even communicate with external entities, such as storage nodes 300, over different networks, thereby allowing some parallel operations. The only requirement is that, whatever network(s) is/are used, the host 100 should be able to transmit and receive data to and from the nodes 300 it needs to access.

The host will also include conventional system software 110 such as, depending on the implementation, an operating system (OS), device drivers, etc. User-level applications 140 then run in the known manner on the system software. Virtual machines (VMs) 130-1, . . . , 130-n may also be included, in which case a hypervisor 120 may be included co-resident with, or incorporated into, the other system software 115.

The host may also include a storage management module 140, which processes data for storage and forwards the processed data to other modules that actually write the data to a chosen persistent storage device, which may be local to the host or in a remote storage node. As one possible example, the module 140 may apply data reduction techniques such as inline compression and deduplication to aid in capturing as much cumulative working data set in local caches as possible. The storage management module may also, for example, update metadata that enables it to retrieve the correct data at a later time in response to a read request from an application or VM. The storage management module 140 may also, for example, be responsible for formatting storage requests from clients (for example, different VMs, or other processes or software or hardware entities that issue storage access requests for, for example, read and write operations) and distributing the data to be stored to the appropriate nodes. As FIG. 1 illustrates, the module 140 may be part of the other system software 115, although it could also be a separate software entity.

The nodes 310-1, 310-2, . . . , 310-N (referenced collectively as 300) will be any form of system that requires coordination among them for software upgrades, which include software installations, updates, etc. Although not illustrated (merely for the sake of simplicity), each node will typically include one or more processors, as well as non-transitory, volatile or non-volatile storage for the executable code that the processor(s) execute to perform the steps used to implement embodiments of this invention.

In implementations such as where the nodes represent storage devices, each node will typically include some form of storage controller 320, which includes controller software. Even other implementations will typically have some form of controller, or at least controller software, which may be an operating system, or control software for some specialized hardware device within the node.

In the example illustrated in FIG. 1, each storage node is shown as including different types of storage devices, in particular, NVRam 312 and a slower persistent medium 340, for example, conventional spinning media. Note that even other storage device technologies, such as SSD, may also be included. Moreover, it is not necessary for a node to have different technologies; for example, a single node could include only NVRam. Each NVRam may include a management software module—an NVRam manager 313—which may, for example, respond to requests and maintain various data structures (such as a log, described below, and any other data structures) relating to the respective NVRam.

In embodiments, NVRam 312 may be exposed to clients with four basic operations: read, write, query, and discard. As one possible illustrative scenario, a client might write data to NVRam, then a short time later write the same data to a slower persistent medium (for example, hard disk 340), and thereafter signal the NVRam to discard the data the client wrote. If the client crashes or loses power after writing to NVRam, but before signaling the NVRam to discard those writes, when the client re-connects, it can query the NVRam for the existence of any non-discarded writes, read those writes from NVRam, write them to the slower persistent medium, and then signal discard of those writes from NVRam.

Identifying client writes (so they can be read, queried or discarded) can be done in various ways. For example, the NVRam may return an identifier in response to a write request, or the identifier may be a unique name provided by the client. One option is for the NVRam, for example, as part of the manager component 313, to support one or more data structures that keep track of writes and discards. One option would be to have a set of buffers, such that a discard operation could indicate any of the buffers to discard. For the sake of succinctness, and by way of example only, the data structures described below are referred to as "logs", in particular, logs to which writes may be appended at one end and truncated from the other. These logs—nvlogs—maintain log information that can be appended to (corresponding to the "write" operation) to each write as it is stored in NVRam. There could be a separate nvlog for each file or object being written to, a single nvlog for all writes from a single client, a single nvlog for writes from all hosts/clients, or any other organization. In general, logs, or even a single log, may thus be spread (including striped) across several nodes. The log information for each write may, for example, comprise a unique sequence number that strictly increases from previous appends. The log will thus grow on writes, but may shrink upon discards. The client can then use the sequence number to read back the data written in that write. For example, via the manager 313, the NVRam can then be queried as to the range of sequence numbers that are valid for that log. Finally, a client may truncate up through a sequence number it specifies, which would correspond to discarding all writes with sequence numbers at or below the specified sequence number. Note that "discarding" need not involve actual deletion in the sense of overwriting or erasing; rather, data may be logically "deleted" simply by removing reference to it in the log and making the NVRam resource available for another write.

To understand one example of how a write operation may be completed, assume that a VM wishes to write data. The VM will typically first issue a write to a virtual disk, which the storage manager 140 may then write, via the manager(s) 313, to one or more of the nvlogs on the storage node(s). This write data may then remain in the log(s) until it can be written to disk 340, possibly after first consolidating it in a data container. Once the write data is written to a persistent device such as a disk 340, the storage manager 140 may instruct the NVRam manager 313 to discard the logged copy of the data.

The NVRam 320 is assumed to be a resource that is more scarce relative to the other storage media 340 and that typically needs to be shared by a number of the clients. This can be done in a number of ways. Examples include:

Each client may be assigned a fixed amount of the NVRam space in any given node, or total across all the nodes (e.g., 10 MB).

The NVRam may be divided equally among the attached or active clients.

The NVRam may be divided dynamically among the clients.

Any suitable mechanism and component may be used to manage the sharing and assignment of NVRam space among the various writing entities, that is, among the hosts/clients. One option is for one of the NVRam manager components 313 to be designated as a "master" manager; alternatively, a separate software entity, not associated with any particular node, may be included for this purpose. The host/client may then ask the NVLog master to create a new nvlog. The master may then select a relatively lightly used storage node and open the nvlog there. Each node may then, using its own manager 313, allocate its available NVRam space among all the hosts according to any chosen routine, and for the sake of load-balancing, an nvlog could even be moved from one node to another.

There are several ways to divide the NVRam dynamically. In general, embodiments indicate to a client/host that it is approaching or has exceeded an allocation limit, that is, its "share", and that it should discard some of its logged writes so as to free NVRam space. The management system may use any known mechanism to determine how much space is available in each NVRam. The indication to clients need not be purely "qualitative" ("You are too close to or have exceeded your NVRam allocation and must free up space") but may also be quantitative. For example, on every write, the management system could return to the writing host a "space left" response, or it would indicate a space "budget", which may be variable, both up and down.

Communicating the indication to the host/client may take place in any chosen manner, and may be initiated by either the management system or a host/client, or both. For example, the management system may, as mentioned above, return the indication in response to every write. The management system could also send a message over the network to the hosts/clients based on some other "trigger", such as on a schedule, after some NVRam "event" such as a large write or discard, the disconnection of some write-intensive host, etc. Alternatively, the host itself may query the management system for a "status" indication, for example in preparation for a large number of high-priority or high-volume writes—if needed, the host may then request discarding of enough previous writes to ensure enough NVRam space. to The method of claim 1, in which the step of indicating to the host comprises responding to a request from the host for an indication.

One approach is to assign to each client a maximum allocation or ceiling on the amount of NVRam it can use. The client may then be informed of its allocation and is then responsible for keeping its use within its allocation. When the allocation changes, clients with reduced allocations may be informed and given time to reduce their usage, for example, by writing their data out to a slower persistent medium such as devices 340. Once NVRam becomes available, clients receiving a larger allocation may be notified of their larger allocation and start using it.

The system, for example, the storage manager component 140, or the node controller 320, or the NVRam manager components 313, or some combination of these in cooperation, may set client allocations based on the rate at which they are writing, externally specified priorities, other metrics the clients provide, Quality of Service (QoS) guarantees given to the respective clients, etc. For example, there could be a metric that affects how much NVRam the client needs to batch up writes to the slower persistent medium in a desired manner. Given these priorities and metrics, the controller 320 within each NVRam module, for example, may then divide the available NVRam either proportionally, based on relative weights, or give the highest priority clients as much as they want, with lower priority clients being given very small amounts of NVRam, but still enough to allow these clients to make forward progress, albeit more slowly. An alternative to setting allocations is for the NVRam, via its controller 320, to track usage by client and when NVRam space needs to be freed up, it identifies the client or clients which should free up NVRam, and asks them to do so.

Another allocation policy may be based on "age". One way to implement this is for the NVRam manager 313 (or a sub-component in it) to maintain an ordered list 350 of NVRam pages (or any other read/write unit) as they are allocated to clients. When such pages need to be freed, the NVRam controller 320 may identify the clients with the pages allocated the longest time in the past and notify those clients that they need to free NVRam. Another way is to keep an accounting, for example, in the list 350, of the total amount of NVRam used by a client and ask the client using the most NVRam to free NVRam pages.

A third alternative is to maintain for each client a space-time accounting, for example, also using the list 350, of the NVRam used by each client. For example, occupancy of one page for one time unit could count as one space-time unit of usage. Occupancy of ten pages for three time units could as 30 space-time units, and so on. Essentially, the system in this embodiment keeps track of the time since each page is allocated to a client, and sums these times for each client. The client or clients with the largest usage may then be asked to free pages.

There are two possible behaviors when NVRam fills up:
Refuse client writes until more space is freed up via a "discard" operation.
The NVRam controller 350 can itself write data to the slower persistent medium 340. It could then spill data from clients going above their allocation or with the largest usage. This provides a more forgiving usage model, with the side effect of slowing down clients that are above their allocation.

Embodiments described above provide for greater flexibility in NVRam allocation than would a scheme in which each host/client is given a fixed allocation and issues discards to keep its NVRam usage within that allocation. Such an arrangement is inefficient in situations where many hosts may be writing to many different nvlogs, because the number of hosts may go up and down; moreover, some hosts may benefit from a lot of NVRam while others don't need it. In contrast, embodiments of this invention efficiently adjust for a varying number of writing hosts and varying need levels, and even varying availability of NVRam within nodes.

What is claimed is:

1. A method for managing a shared storage resource in a data storage system that has a plurality of hosts that write data, comprising:
   receiving, from at least one of the hosts, requests to write data to a relatively high-performance storage device;
   in response to the requests, writing data to the relatively high-performance storage device;
   wherein writing the data includes appending write data to a log within the relatively high-performance storage device;
   associating respective sequence numbers with each write of data, by the at least one of the hosts, to the loci within the relatively high-performance storage device;
   according to an allocation policy, indicating to a particular host, of the plurality of hosts, that it should limit its use of the relatively high-performance storage device;
   after indicating to the particular host that it should limit its use of the relatively high-performance storage device:
      receiving, from the particular host, an indication of data to discard from the relatively high-performance storage device; and
      discarding the data that corresponds to the indication from the relatively high-performance storage device;
   wherein receiving the indication of data to discard includes receiving a request by the particular host to truncate the log up to a specified one of the sequence numbers; and
   wherein discarding the data that corresponds to the indication includes discarding, from the log, write data having sequence numbers less than or equal to the specified one of the sequence numbers.

2. The method of claim 1, in which the step of indicating to the particular host comprises returning, upon each write of data by the particular host to the relatively high-performance storage device, an indication of how much space the particular host has left in the relatively high-performance storage device, according to the allocation policy.

3. The method of claim 1, in which the step of indicating to the particular host comprises returning, upon each write of data by the particular host to the relatively high-performance storage device, an indication of a variable space budget.

4. The method of claim 1, in which the step of indicating to the particular host comprises returning said indication as part of a response to a write request from the particular host.

5. The method of claim 1, in which the step of indicating to the particular host comprises responding to a request from the particular host for an indication.

6. The method of claim 1, in which the step of indicating to the particular host comprises sending a message to the particular host over a network.

7. The method of claim 1, further comprising discarding data from the log after the data has been written to a persistent storage device.

8. The method of claim 1, further comprising directing any of the hosts, of the plurality of hosts, that have exceeded a respective allocation of the relatively high-performance storage device to reduce the amount of space they use in the relatively high-performance storage device.

9. The method of claim 1, comprising allocating to each of the hosts, of the plurality of hosts, a fixed amount of space in the relatively high-performance storage device.

10. The method of claim 1, comprising allocating to each of the hosts, of the plurality of hosts, a fixed total amount of space in the relatively high-performance storage devices of a plurality of storage nodes.

11. The method of claim 1, comprising allocating to each of the hosts, of the plurality of hosts, an equal amount of space in the relatively high-performance storage device.

12. The method of claim 1, comprising dynamically allocating space in the relatively high-performance storage device to each of the hosts of the plurality of hosts.

13. The method of claim 12, further comprising dynamically allocating a maximum amount of space in the relatively high-performance storage device to each of the hosts of the plurality of hosts.

14. The method of claim 12, further comprising allocating space in the relatively high-performance storage device to each of the hosts according to respective host metrics.

15. The method of claim 14, in which the respective host metrics used to allocate space in the relatively high-performance storage device includes a write rate of each host of the plurality of hosts.

16. The method of claim 12, further comprising:
assigning a priority to each host of the plurality of hosts,
allocating space in the relatively high-performance storage device among the plurality of hosts according to their respective priorities; and
directing hosts, of the plurality of hosts, to reduce the amount of space they use in the relatively high-performance storage device in order of lowest priority to highest priority.

17. The method of claim 16, further comprising allocating at least some space in the relatively high-performance storage device to every host of the plurality of hosts.

18. The method of claim 12, further comprising:
allocating space in the relatively high-performance storage device as a function of the age of write units of data written by each host, of the plurality of hosts, to the relatively high-performance storage device, and
directing hosts having relatively older data to reduce the amount of space they use in the relatively high-performance storage device before hosts having relatively younger data.

19. The method of claim 12, further comprising allocating space in the relatively high-performance storage device as a function of the total amount of space used by the respective hosts in the relatively high-performance storage device, by directing hosts, of the plurality of hosts, that use a relatively larger amount of space on the relatively high-performance storage device to age out write units of data that they have written to the relatively high-performance storage device.

20. The method of claim 12, further comprising:
determining a space-time usage metric for each of the hosts of the plurality of hosts,
wherein said space-time metric is a function of both:
the amount of the relatively high-performance storage device used by each host, and
the duration of the respective hosts' write data in the relatively high-performance storage device, and
directing hosts having relatively higher space-time metrics to reduce the amount of space they use in the relatively high-performance storage device before hosts having relatively lower space-time metrics.

21. The method of claim 12, further comprising, upon determining that the relatively high-performance storage device is full, such that it cannot store more write data from the hosts, refusing further requests by the hosts to write data to the relatively high-performance storage device until space becomes available in the relatively high-performance storage device.

22. The method of claim 12, further comprising, upon determining that the relatively high-performance storage device is full, such that it cannot store more write data from the hosts, writing selected data from the relatively high-performance storage device to the persistent storage device and discarding that data from the relatively high-performance storage device.

23. The method of claim 22, further comprising selecting the data for writing to the persistent storage device as being the data corresponding to the host(s) that exceed their allocation(s) or, if none exceed, the host(s) having the largest usage of their respective allocations.

24. A data storage system comprising:
a plurality of hosts;
a storage management system, operatively coupled to the plurality of hosts;
the storage management system storing instructions which, when executed, cause:
receiving, from at least one of the hosts, requests to write data to a relatively high-performance storage device;
in response to the requests, writing data to the relatively high-performance storage device;
wherein writing the data includes appending write data to a log within the relatively high-performance storage device;
associating respective sequence numbers with each write of data, by the at least one of the hosts, to the loci within the relatively high-performance storage device;
according to an allocation policy, indicating to a particular host, of the plurality of hosts, that it should limit its use of the relatively high-performance storage device; after indicating to the particular host that it should limit its use of the relatively high-performance storage device:
receiving, from the particular host, an indication of data to discard from the relatively high-performance storage device; and
discarding the data that corresponds to the indication from the relatively high-performance storage device;
wherein receiving the indication of data to discard includes receiving a request by the particular host to truncate the log up to a specified one of the sequence numbers; and
wherein discarding the data that corresponds to the indication includes discarding, from the log, write data having sequence numbers less than or equal to the specified one of the sequence numbers.

25. The system of claim 24, in which the instructions include instructions for returning to the particular host, upon each write of data by the particular host to the relatively high-performance storage device, an indication of how much space the particular host has left in the relatively high-performance storage device, according to the allocation policy.

26. The system of claim 24, in which the instructions include instructions returning to the particular host, upon each write of data by the particular host to the relatively high-performance storage device, an indication of a variable space budget.

27. The system of claim 24, in which the instructions include instructions for indicating to the host by returning said indication as part of a response to the host's write request.

28. The system of claim 24, in which the instructions include instructions for indicating to the particular host by responding to a request from the particular host for an indication.

29. The system of claim 24, in which the instructions include instructions for indicating to the particular host by sending a message to the particular host over the network.

30. The system of claim 24, further comprising a persistent storage device, in which the instructions include instructions for discarding the data from the relatively high-performance storage device after the data has been written to the persistent storage device.

31. The system of claim 24, in which the instructions include instructions for directing any of the hosts that have exceeded a respective allocation of the relatively high-performance storage device to reduce the amount of space they use in the relatively high-performance storage device.

32. The system of claim 24, in which the instructions include instructions for allocating to each of the hosts a fixed amount of space in the relatively high-performance storage device.

33. The system of claim 24, in which the instructions include instructions for allocating to each of the hosts a fixed total amount of space in the relatively high-performance storage devices of a plurality of storage nodes.

34. The system of claim 24, in which the instructions include instructions for allocating to each of the hosts an equal amount of space in the relatively high-performance storage device.

35. The system of claim 24, in which the instructions include instructions for dynamically allocating space in the relatively high-performance storage device to each of the hosts.

36. The system of claim 24, further comprising a plurality of nodes that each include at least one relatively high-performance storage device.

37. The system of claim 36, further comprising a control component associated with each relatively high-performance storage device, wherein the control component executes instructions for controlling writes and discards from the respective relatively high-performance storage device.

38. The system of claim 37, in which one of the control components is a master controller managing sharing and assignment of space in the relatively high-performance storage devices among the plurality of hosts.

39. The system of claim 24, in which the relatively high-performance storage device is non-volatile RAM.

* * * * *